US011821907B2

(12) United States Patent
Koerschner

(10) Patent No.: US 11,821,907 B2
(45) Date of Patent: Nov. 21, 2023

(54) BUOYOMETER

(71) Applicant: Michael Frederick Koerschner, Asheville, NC (US)

(72) Inventor: Michael Frederick Koerschner, Asheville, NC (US)

( * ) Notice: Subject to any disclaimer, the term of this patent is extended or adjusted under 35 U.S.C. 154(b) by 43 days.

(21) Appl. No.: 17/195,545

(22) Filed: Mar. 8, 2021

(65) Prior Publication Data

US 2022/0283067 A1 Sep. 8, 2022
US 2023/0236101 A9 Jul. 27, 2023

Related U.S. Application Data

(60) Provisional application No. 62/987,305, filed on Mar. 9, 2020.

(51) Int. Cl.
*G01N 9/12* (2006.01)
*G01N 9/20* (2006.01)
*G01N 9/18* (2006.01)
*G01N 9/02* (2006.01)

(52) U.S. Cl.
CPC .............. *G01N 9/20* (2013.01); *G01N 9/02* (2013.01); *G01N 9/18* (2013.01); *G01N 2009/026* (2013.01)

(58) Field of Classification Search
CPC ............ G01G 5/02; G01G 5/04; G01G 19/44; G01N 9/20; G01N 2009/026; G01N 9/12; G01N 9/18; G01N 9/08; G01C 5/06
See application file for complete search history.

(56) References Cited

U.S. PATENT DOCUMENTS

| 1,023,154 | A | | 4/1912 | Kenerson |
| 3,371,538 | A | * | 3/1968 | Bagby ................ G01F 23/04 33/717 |
| 4,184,371 | A | | 1/1980 | Brachet |
| 4,753,307 | A | | 6/1988 | Muehlenbein |

(Continued)

FOREIGN PATENT DOCUMENTS

| RU | 2312323 C1 | * | 12/2007 |
| RU | 2328406 C1 | * | 7/2008 |
| RU | 2473071 C1 | * | 1/2013 |

OTHER PUBLICATIONS

EPA; Drum Sampling; SOP#: 2009; https://dem.ri.gov/sites/g/files/xkgbur861/files/pubs/sops/wmsr2009.pdf, published Nov. 16, 1994; accessed on Nov. 21, 2022. (Year: 1994).*

(Continued)

*Primary Examiner* — Daniel J Colilla
(74) *Attorney, Agent, or Firm* — Nelson Mullins Riley & Scarborough LLP

(57) ABSTRACT

Invention is a device to allow a person to self-measure hydrostatic weight.
The method comprises of using the device (Buoyometer) in a pool or other body of liquid of known density to counter the force of gravity pulling the body downwards. The point of neutral buoyancy—that is the point where the Buoyometer's buoyancy exactly equals the gravitational force is measured and from that hydrostatic weight is calculated.
Hydrostatic weight is then used to assess body density—and thus body composition—using previously determined empirical equations.

19 Claims, 5 Drawing Sheets

(56) References Cited

U.S. PATENT DOCUMENTS 4,873,866 A * 10/1989 Fairbanks ............... G01N 9/10
73/437

OTHER PUBLICATIONS

"Bodyfat—Accurate and Easy Determination;" Feb. 2003; retrieved May 10, 2023 from https://mb-soft.com/public2/bodyfat.html.
"Bod Pod;" *Mayo Clinic*; retrieved May 11, 2023 from https://www.mayoclinic.org/healthy-lifestyle/fitness/multimedia/bod-pod/img-20008079#:~:text=A%20Bod%20Pod%20is%20a,your%20percentage%20of%20body%20fat.
"Radiation in Healthcare: Bone Density (DEXA Scan);" *Centers for Disease Control and Prevention*; Oct. 20, 2021; retrieved May 11, 2023 from https://www.cdc.gov/nceh/radiation/dexa-scan.html#:~:text=DEXA%20(dual%20x%2Dray%20absorptiometry,the%20hip%20and%20the%20spine.
Wood; "Siri Equation;" *Topend Sports*; 2008; retrieved May 11, 2023 from https://www.topendsports.com/testing/siri-equation.htm.
"Archimedes' Principle;" *Encyclopaedia Britannica*; Apr. 27, 2023; retrieved May 11, 2023 from https://www.britannica.com/science/Archimedes-principle.
"What is Hydrostatic Weighing?;" *healthline*; Aug. 10, 2020; retrieved May 11, 2023 from https://www.healthline.com/health/hydrostatic-weighing#summary.

* cited by examiner

Pictorial Representation of BuoyOMeter
[not to Scale; sizes will vary upon application]

BUOYOMETER

CROSS-REFERENCE TO RELATED APPLICATION(S)

This application claims priority to U.S. provisional Patent Application No. 62/987,305, filed Mar. 9, 2020, entitled "Buoyometer", which is hereby incorporated by reference in its entirety.

FIELD OF THE INVENTION

Example embodiments of the present invention generally relate to methods and devices for determining a hydrostatic weight of a body.

BACKGROUND

The hydrostatic weight of any object/subject may be determined by fully immersing the object/subject in a body of the liquid of known density.

BRIEF SUMMARY

Some example embodiments of the present invention include a device and method of self-determining the hydrostatic weight of a body. In some embodiments, the device and/or method may include submerging a device fully in a liquid of known density, pulling the device—perpendicular to surface of the liquid—towards the body until neutral buoyancy is attained (buoyant force exactly equal to force of gravity), and, at that moment marking the depth of the device's submersion by sealing the column of liquid of known density with a finger to "read" the depth of the Buoyometer submersion that was necessary to attain neutral buoyancy.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
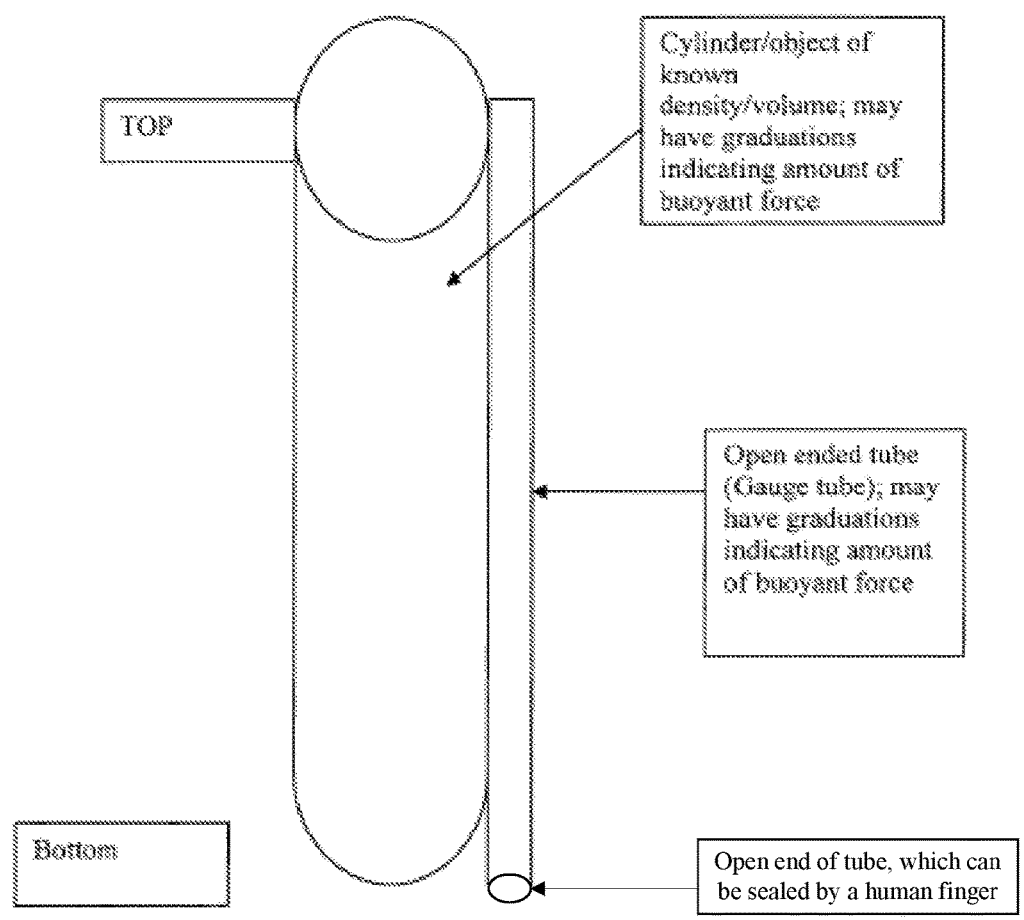
FIG. 1 illustrates an example device for determining a hydrostatic weight, in accordance with some embodiments discussed herein.

A hydrostatic weighing device and a method of use are provided. The invention prototype comprises a sealed container ("float tube") containing a known volume of air and an unsealed open-ended tube ("gauge tube") physically attached to the "float tube" (generally as long as float tube and generally parallel). The combined device ("float tube" and "gauge tube") is hereinafter named the Buoyometer [FIG. 1]. Note that the "float tube" could be non-tubular in shape (for example, it could be a long rectangle). Also, the "float tube" could be any material of known volume and density—the only requirement is that the density of the "float tube" must be less than the density of the fluid the body or object will be immersed in. The purpose of the device (buoyometer) is to measure the magnitude (volume/weight) of the displacement of the fluid of known density it is immersed in.

The "gauge tube" is used to measure the immersion depth of the "float tube" in the fluid of known density.

Figure 2:
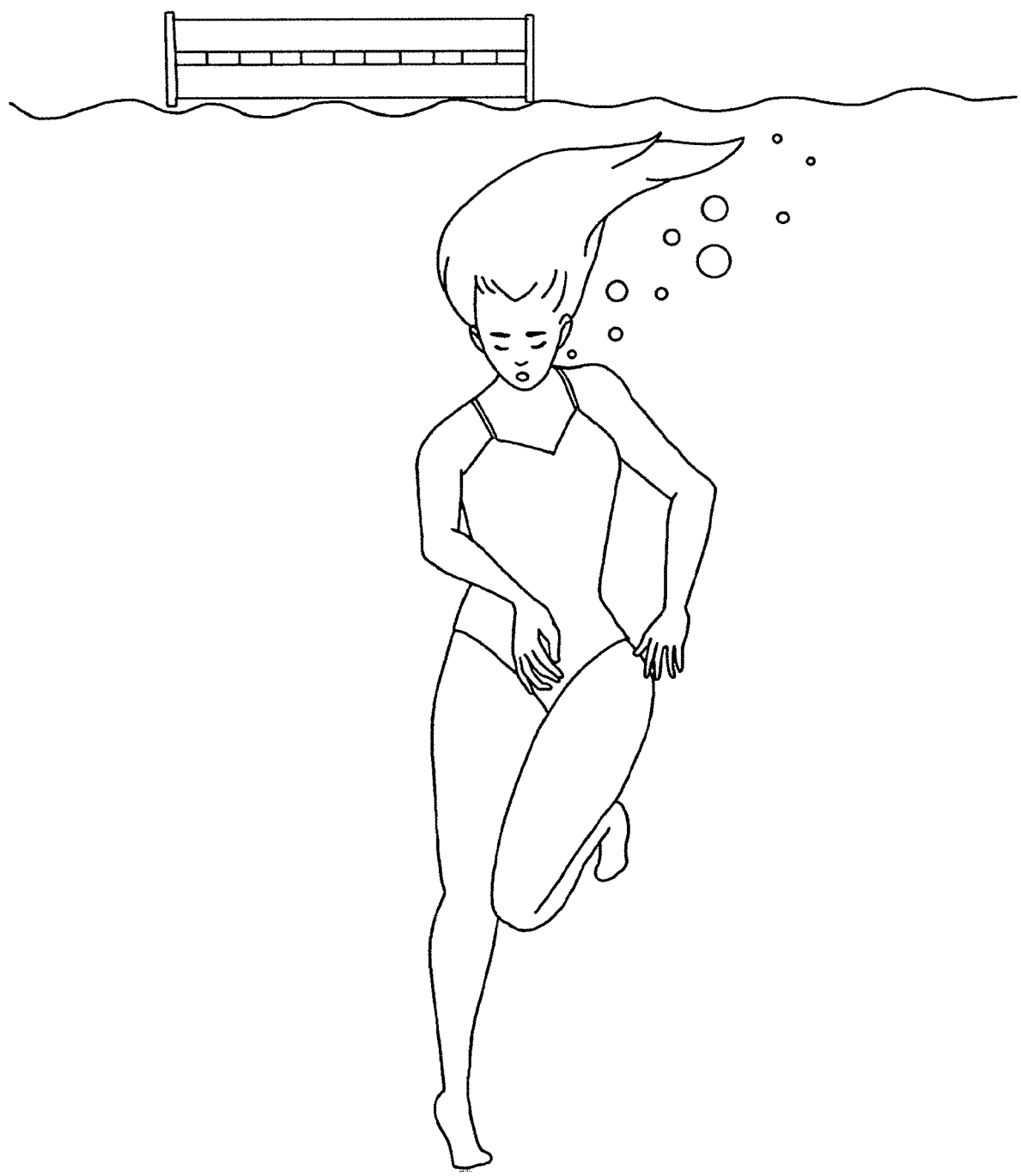
FIG. 2 illustrates another example device for determining a hydrostatic weight along with a person that is underwater, in accordance with some embodiments discussed herein.
Figure 3:
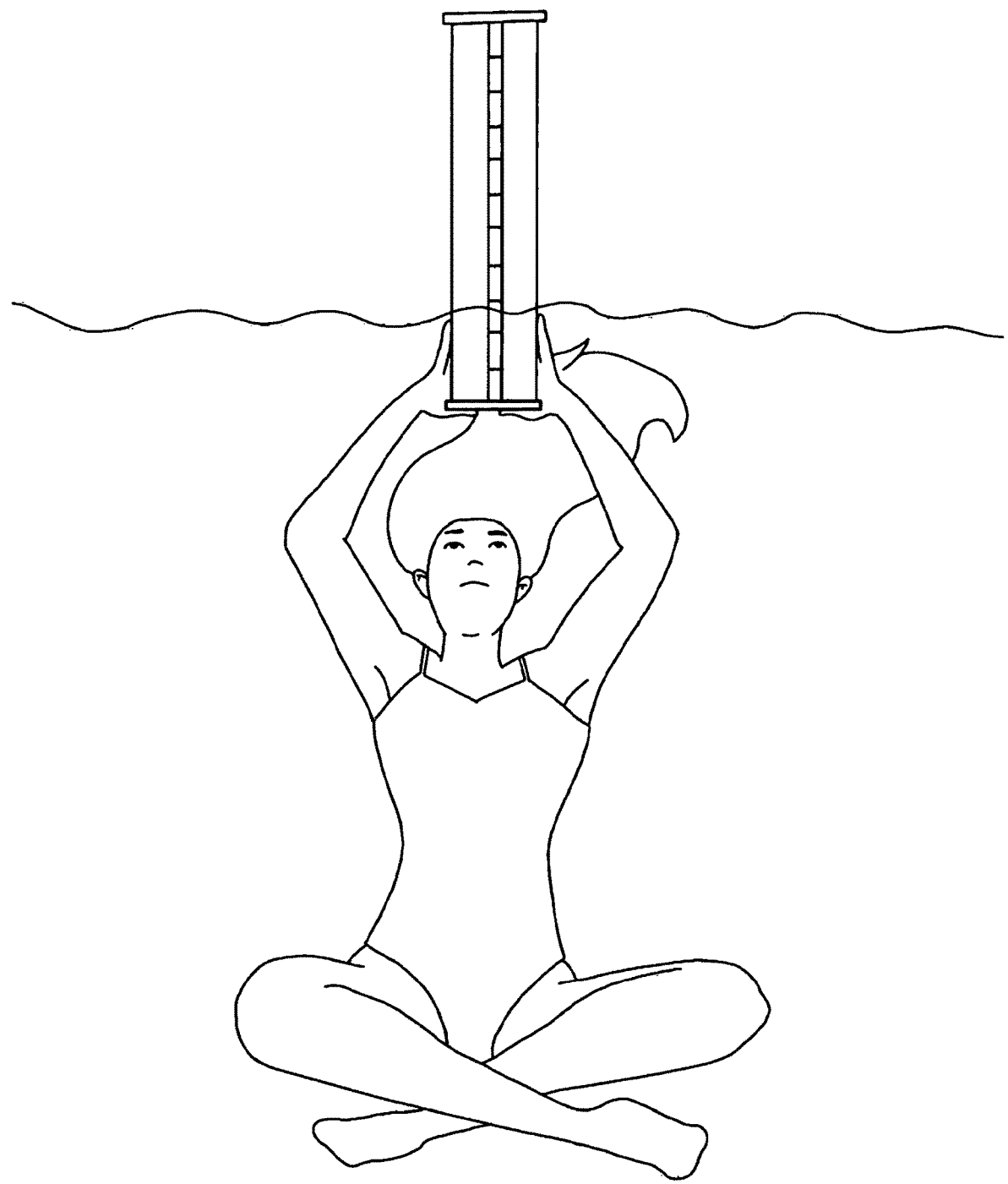
FIG. 3 illustrates the example device of FIG. 2 being used by the person, in accordance with some embodiments discussed herein.
Figure 4:
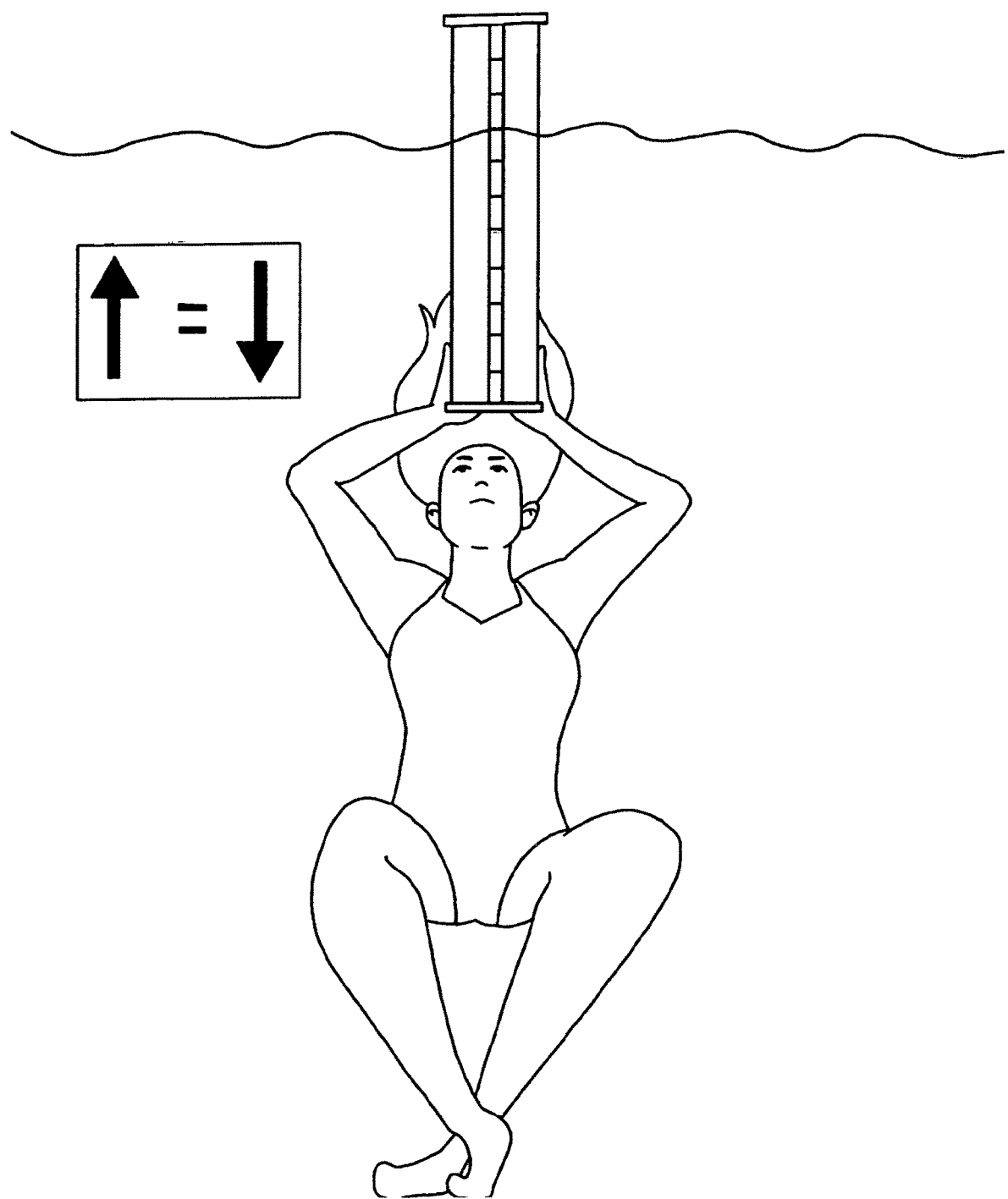
FIG. 4 illustrates the example device of FIGS. 2-3 wherein neutral buoyancy has been attained, in accordance with some embodiments discussed herein.
Figure 5:
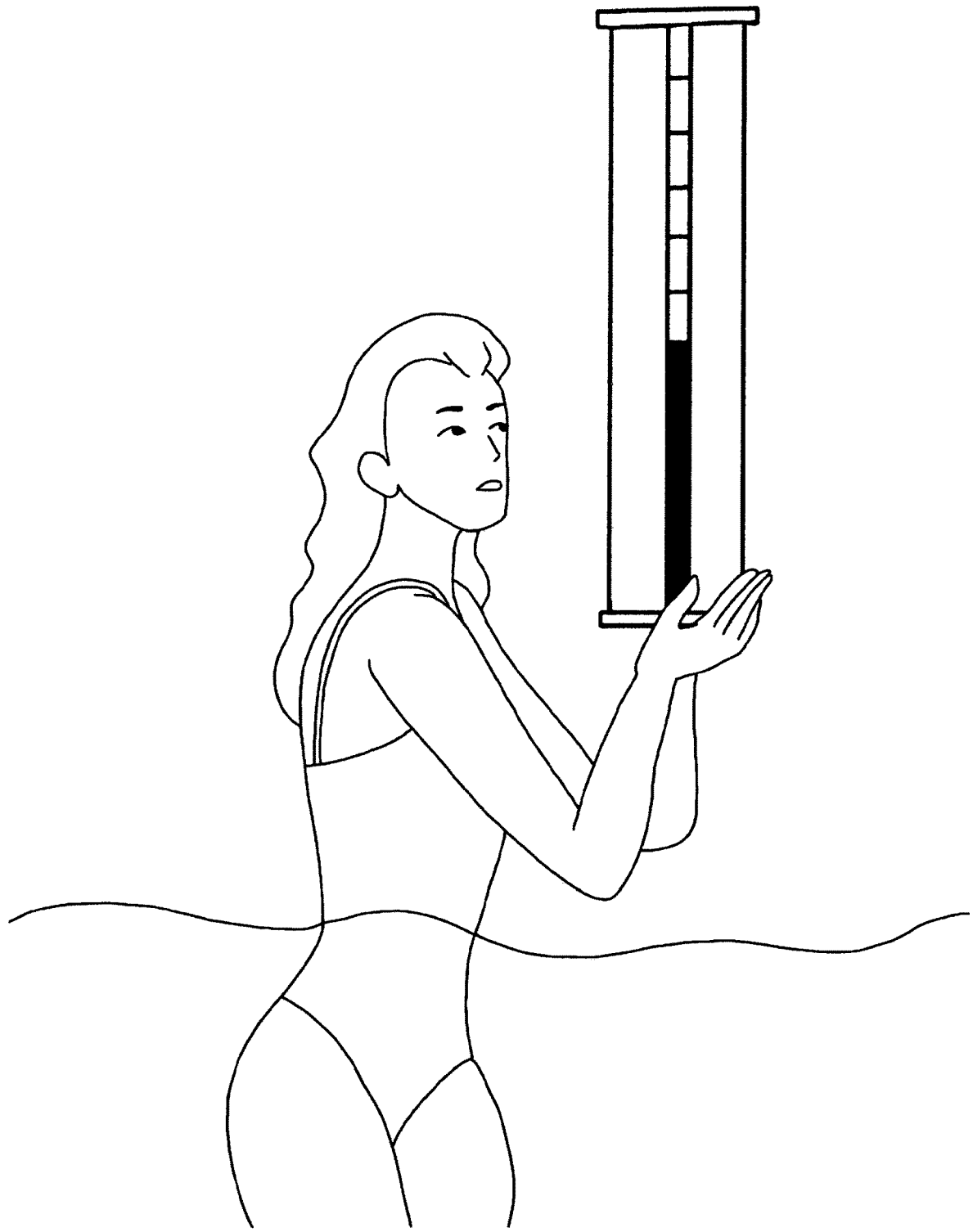
FIG. 5 illustrates the example device of FIGS. 2-4 being used to determine a hydrostatic weight of the person, in accordance with some example embodiments discussed herein.

The hydrostatic weight of any object/subject denser than the liquid of known density (generally water) is determined by fully immersing the object/subject in a body of the liquid of known density (generally water) [FIG. 2]. The subject then pulls the BuoyOMeter downwards such that the BuoyOMeter remains exactly vertical in orientation (perpendicular to the surface of the fluid [FIG. 3]) until the subject's hydrostatic weight (Downward force) is balanced by the BuoyOMeter's buoyant force (Upward force) [FIG. 4]. When this occurs, the individual seals the "gauge tube" (with a finger)—sealing the height of the column of water in the "gauge tube" representing the depth that the "float tube" was submerged at force equilibrium (neutral buoyancy) [FIG. 5]. The hydrostatic weight of the subject is thus determined via Archimedes Principle [determining the amount of upward force exerted when the forces were balanced (Downward force=Upward force)]. This can be determined by measuring the height of the column of water residing in the sealed "gauge tube" via graduations on the "float tube" or on the "gauge tube."

This device and method can be used to determine the hydrostatic weight of ANY object fully submerged in any liquid of known density. For subjects that are less dense than water, this device may be utilized in conjunction with underwater weights of known density. That is, the subject would physically attach to himself/herself/itself an item of known underwater (hydrostatic) weight. By adding items of known underwater weight until totally submerged, the method of determining underwater weight (even negative underwater weight—that is, buoyancy) can be determined as described above.

For increased accuracy, the "float tube" would be narrower and/or floats of known volume could be used to buoy the subject during measurement. For example, if a subject weighed between 5.1 and 6.0 pounds underwater, a known volume float equivalent to 5.0 lbs buoyancy could be attached to the subject and the subject could use a relatively smaller diameter tubular "float tube" to determine exactly the hydrostatic weight. The relatively narrower "float tube" would increase accuracy.

I claim:

1. A method for determining a hydrostatic weight of a body, the method comprising:

submerging a body in a liquid, wherein the liquid has a known density;

positioning a device that is connected to the body such that the device is at least partially outside of the liquid, wherein the device has a known hydrostatic weight, wherein the device comprises an open tube with a gauge, wherein an orifice of the open tube is sealable by a finger;

moving the device into the liquid until an instance in which a buoyant force on the body is equal to a force of gravity on the body; and determining a gauge level at the instance in which the buoyant force on the body is equal to the force of gravity on the body by sealing the orifice of the open tube with the finger such that the open tube contains an amount of the liquid.

2. The method of claim 1, wherein the method further comprises removing a predetermined amount of air from the body before positioning the device that is connected to the body such that the device is at least partially outside of the liquid.

3. The method of claim 1, wherein the method further comprises:
determining the hydrostatic weight of the body using:
the known density of the liquid; and
the gauge level.

4. The method of claim 3, wherein the method further includes using the hydrostatic weight to determine a fat mass percentage of the body.

5. The method of claim 4, wherein the method further includes using the fat mass percentage to determine a lean body mass of the body.

6. The method of claim 1, wherein the device is positioned and moved such that the device is perpendicular to a surface of the liquid.

7. The method of claim 1, wherein submerging the body in the liquid further includes, in an instance in which the body is less dense than the liquid, connecting a weight having a second known density to the body such that the body and the weight together are more dense than the liquid.

8. The method of claim 1, wherein sealing the orifice of the open tube with the finger such that the open tube contains the amount of the liquid causes the amount of the liquid to be statically retained within the open tube.

9. The method of claim 1, wherein the fluid is air.

10. The method of claim 1, wherein the liquid is water.

11. The method of claim 1, wherein the instance in which the buoyant force on the body is equal to the force of gravity on the body is an instance in which the body is suspended within the liquid with no movement.

12. The method of claim 1, wherein the gauge of the open tube further comprises a float member and a plurality of markings, and wherein the float member and the plurality of markings are configured to quantify the buoyant force.

13. The method of claim 1, wherein the method is for self-determining the hydrostatic weight of the body.

14. A device for determining a hydrostatic weight of a body, the device comprising:
an open tube with a gauge, wherein an orifice of the open tube is sealable by a finger, wherein the gauge of the open tube comprises a float member and a plurality of markings,
wherein the device has a known hydrostatic weight, wherein the device is connected to a body, wherein the device is configured to determine a gauge level at an instance in which a buoyant force on the body is equal to a force of gravity on the body by sealing the orifice of the open tube with the finger such that the open tube contains an amount of the liquid when:
the body is submerged in a liquid with a known density; and
the device is moved into the liquid until the instance in which the buoyant force on the body is equal to the force of gravity on the body, a seal occurring to the open tube at that instance, and
wherein the float member and the plurality of markings are configured to quantify the buoyant force.

15. The device of claim 14, wherein, in an instance in which the body is less dense than the liquid, a weight having a second known density is connected to the body such that the body and the weight together are more dense than the liquid.

16. The device of claim 14, wherein sealing the orifice of the open tube with the finger such that the open tube contains the amount of the liquid causes the amount of the liquid to be statically retained within the open tube.

17. The device of claim 14, wherein the device is positioned and moved such that the device is perpendicular to a surface of the liquid.

18. The device of claim 14, wherein the device is used to self-determine the hydrostatic weight of the body.

19. The device of claim 14, wherein the instance in which the buoyant force on the body is equal to the force of gravity on the body is an instance in which the body is suspended within the liquid with no movement.

* * * * *